United States Patent
Sonthy et al.

(10) Patent No.: US 11,018,975 B2
(45) Date of Patent: May 25, 2021

(54) CACHING FLOW OPERATION RESULTS IN SOFTWARE DEFINED NETWORKS

(71) Applicant: Nicira, Inc., Palo Alto, CA (US)

(72) Inventors: Aditya Krishna Sonthy, Milpitas, CA (US); Alexander N. Tessmer, San Jose, CA (US); Ganesan Chandrashekhar, Campbell, CA (US); Samuel Jacob, Fremont, CA (US); Boon Seong Ang, Saratoga, CA (US); Hongwei Zhu, Mountain View, CA (US); Rajeev Nair, Newark, CA (US)

(73) Assignee: Nicira, Inc., Palo Alto, CA (US)

( * ) Notice: Subject to any disclaimer, the term of this patent is extended or adjusted under 35 U.S.C. 154(b) by 0 days.

(21) Appl. No.: 15/946,108

(22) Filed: Apr. 5, 2018

(65) Prior Publication Data
US 2019/0312808 A1 Oct. 10, 2019

(51) Int. Cl.
*H04L 12/721* (2013.01)
*H04L 29/08* (2006.01)
*H04L 29/06* (2006.01)

(52) U.S. Cl.
CPC .......... *H04L 45/72* (2013.01); *H04L 67/2842* (2013.01); *H04L 69/22* (2013.01); *H04L 2212/00* (2013.01)

(58) Field of Classification Search
CPC ..... H04L 45/72; H04L 67/2842; H04L 69/22; H04L 2212/00
See application file for complete search history.

(56) References Cited

U.S. PATENT DOCUMENTS

| | | | |
|---|---|---|---|
| 2013/0170435 A1* | 7/2013 | Dinan | H04W 40/02 370/328 |
| 2015/0010000 A1* | 1/2015 | Zhang | H04L 45/38 370/392 |
| 2015/0169451 A1* | 6/2015 | Jackson | G06F 12/0808 711/135 |
| 2015/0188770 A1* | 7/2015 | Naiksatam | H04L 45/586 370/254 |
| 2016/0020939 A1* | 1/2016 | Ramasubramanian | H04L 41/0659 370/217 |
| 2016/0021032 A1* | 1/2016 | Maier | H04L 49/70 370/401 |
| 2016/0142285 A1* | 5/2016 | Lee | H04L 43/0811 370/392 |
| 2016/0191384 A1* | 6/2016 | Shelar | H04L 45/38 370/392 |
| 2017/0063786 A1* | 3/2017 | Pettit | H04L 69/22 |
| 2017/0064048 A1* | 3/2017 | Pettit | H04L 45/742 |

(Continued)

*Primary Examiner* — Ajay Cattungal

(57) ABSTRACT

Described herein are systems, methods, and software to enhance flow operations on a host computing system. In one implementation, a virtual switch on a host identifies a packet from a virtual node. In response to identifying the packet, the virtual switch determines whether the packet corresponds to a cached result action based on traits of the packet. If the packet corresponds to a cached result action, then the virtual switch may process the packet in accordance with the cached result action. In contrast, if the packet does not correspond to a cached result action, then the virtual switch may process the packet in accordance with first flow operations to determine a result action, and cache the result action for use with future packets.

20 Claims, 9 Drawing Sheets

(56) References Cited

U.S. PATENT DOCUMENTS

| | | | |
|---|---|---|---|
| 2017/0091258 A1* | 3/2017 | Rajahalme | H04L 45/021 |
| 2017/0118113 A1* | 4/2017 | Vemulapalli | G06F 13/102 |
| 2017/0264497 A1* | 9/2017 | Lim | H04L 43/026 |
| 2018/0083876 A1* | 3/2018 | Sharma | H04L 45/54 |
| 2019/0149516 A1* | 5/2019 | Rajahalme | H04L 69/22 370/392 |
| 2019/0149518 A1* | 5/2019 | Sevinc | H04L 63/0263 726/11 |

* cited by examiner

CACHING FLOW OPERATION RESULTS IN SOFTWARE DEFINED NETWORKS

BACKGROUND

In computing environments, virtual switches may be used that comprise software modules capable of providing a communication platform for one or more virtual nodes in the computing environment. These virtual switches may provide switching operations, routing operations, distributed firewall operations, encapsulation operations, and the like, and may be used to intelligently direct communication on the network by inspecting packets before passing them to other computing nodes (both physical and virtual). For example, packets may be inspected to determine the source and destination internet protocol (IP) addresses to determine if the communication is permitted to be delivered to the destination computing node. In some implementations, virtual switches may be configured with flow operations, or flow tables, that define rules and actions to be taken against a packet. These flow operations identify specific attributes, such as IP addresses, media access control (MAC) addresses, and the like, within the data packet and, when identified, provide a set of actions to be asserted against the data packet. These actions may include modifications to the data packet, encapsulation operations on the packet, forwarding rules for the data packet, amongst other possible actions.

In implementing the flow operations on the virtual switches, a packet may be required to traverse multiple flow operations prior to being forwarded to the destination computing node. For example, a packet may be required to traverse a firewall flow operation prior to traversing an encapsulation flow operation. However, while traversing multiple flow operations may provide the desired actions for the packet, the traversal may introduce latency and require unnecessary resources of the host computing system. These inefficiencies may be compounded when multiple packets with similar traits are required to iteratively traverse the same flow operations.

OVERVIEW

The technology disclosed herein enhances the processing of similar packets in a virtual switch. In one implementation, a method of operating a virtual switch on a host computing system includes identifying a packet from a first virtual node with first traits, and determining whether a cached result action in a set of result actions is associated with the first traits. If a cached result action is not associated with the first traits, the method further provides for processing the packet in accordance with first flow operations to determine a result action, and caching the result action with the set of result actions. The method also provides, if a cached result action is associated with the first traits, processing the packet in accordance with the cached result action.

DETAILED DESCRIPTION

Figure 1:
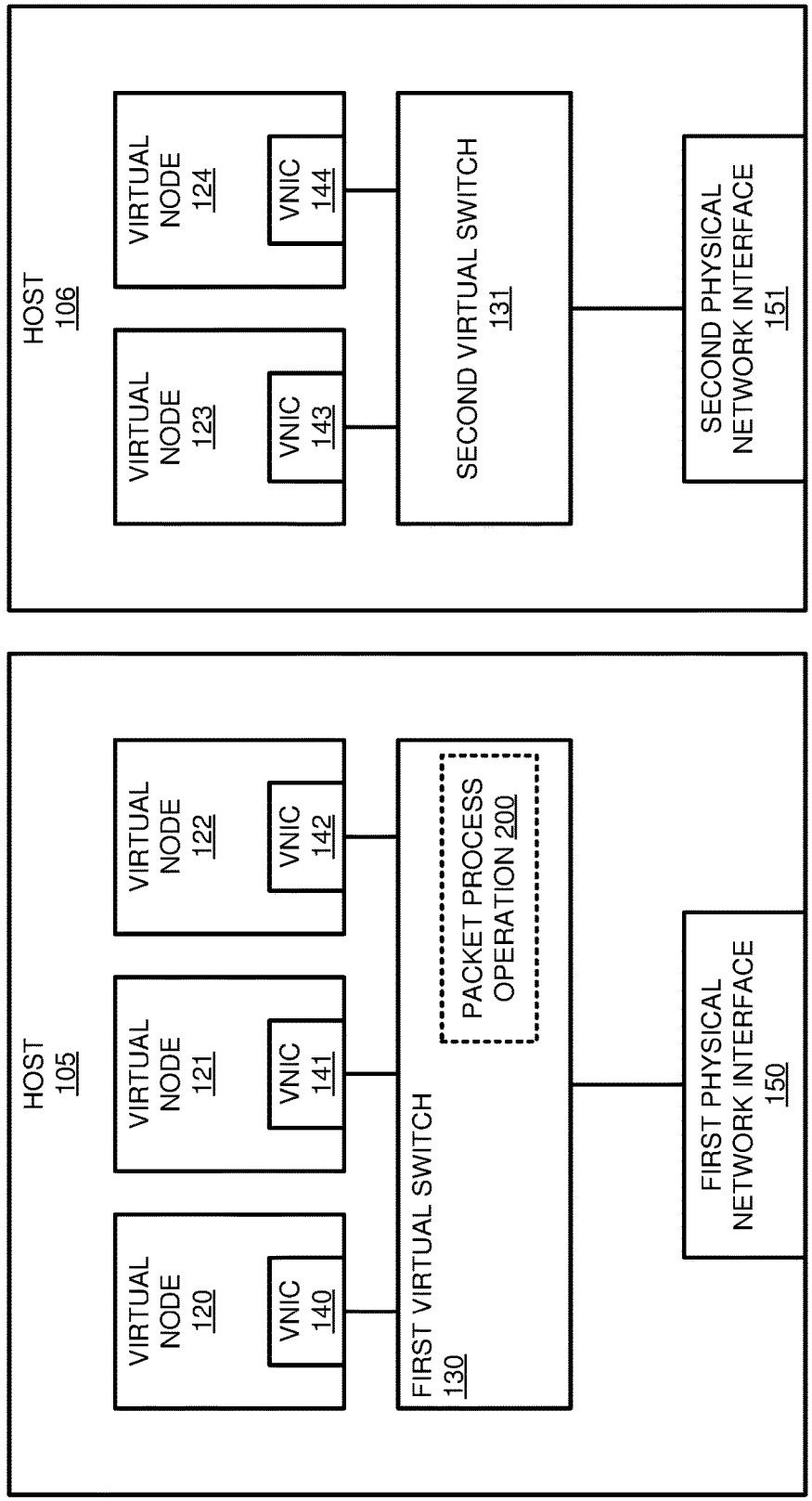
FIG. 1 illustrates a computing environment to cache results of flow operations according to an implementation.

FIG. 1 illustrates a computing environment 100 to cache results of flow operations according to an implementation. Computing environment 100 includes hosts 105-106, wherein hosts 105-06 further include virtual nodes 120-124, virtual switches 130-131 and physical network interfaces 150-151. Each virtual node of virtual nodes 140-144 include a corresponding virtual network interface of virtual network interfaces (VNICS) 140-144. First virtual switch 130 is configured to provide packet process operation 200 that is further described in FIG. 2.

In operation, hosts 105-106 provide a platform for the execution of virtual nodes 120-124, wherein virtual nodes 120-124 may comprise full operating system virtual machines and/or containers. Full operating system virtual machines execute via a hypervisor, and run their own operating system kernel via abstracted processing system resources, storage resources, network resources, and the like provided by the hosting hypervisor. Unlike virtual machines, containers, which may comprise Docker containers, Linux containers, or some other similar type of container, share host resources, such as kernel resource of the host operating system (from host 105 or host 106) and any allocated shared binaries. The containers may include their own identifier space and file structure, and may be allocated separate virtual network interfaces from the host systems.

In the present implementation, to provide the networking for virtual nodes 120-124, VNICS 140-144 are provided that communicate via virtual switches 130-131. Virtual switches 140-141 comprise software modules capable of providing switching operations, routing operations, distributed firewall operations, encapsulation and encryption operations, or some other similar operation. Virtual switches 130-131 are "virtual" in the sense that they are implemented in software, but they are connected to and communicate with the physical network via physical network interfaces 150-151. The virtual switches are responsible for forwarding packets between virtual nodes on the same host, and are further responsible for managing packets for the virtual nodes that are transmitted and/or received over physical network interfaces 150-151. In managing the communications between virtual nodes local to a host and physical and virtual nodes external to the host, example packet process operation 200 is provided, wherein packet process operation 200 is used to efficiently manage the processing of data packets over multiple flow operations. In particular, rather than requiring each packet of a communication to be processed via multiple flow operations or tables, packet process operation 200 may identify a result (also referred to herein as a result action) of a first packet in a communication (e.g. header modifications, encryption, and the like) and apply the result to packets identified with similar traits.

Figure 2:
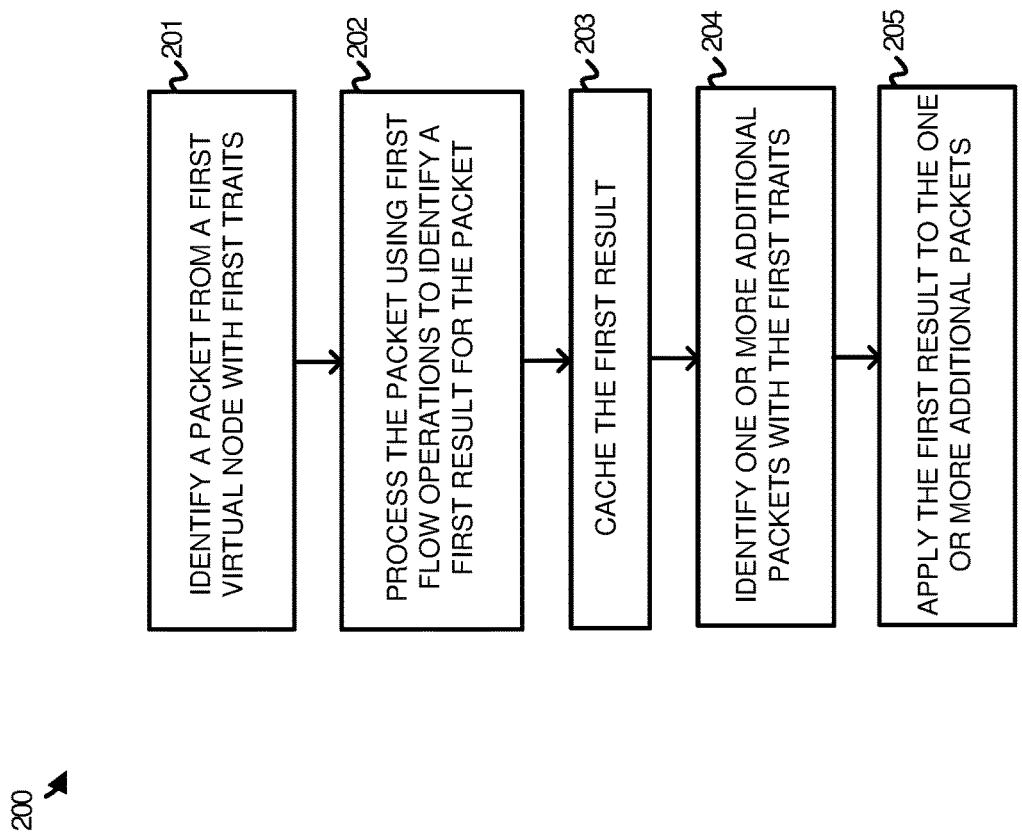
FIG. 2 illustrates a packet process operation of a virtual switch to cache results of flow operations according to an implementation.

FIG. 2 illustrates a packet process operation 200 of a virtual switch to cache results of flow operations according to an implementation. Operation 200 is described parenthetically in the paragraphs that follow with reference to systems and elements of computing environment 100 of FIG. 1. Although demonstrated in the example of FIG. 2 as being applied within first virtual switch 130, it should be understood that similar operations may be applied by second virtual switch 131.

As depicted, operation 200 includes identifying (201) a packet from a first virtual node with first traits (such as addressing traits in the header of the packet), wherein the packet is the first packet identified by the virtual switch with the first traits. In response to identifying the packet, operation 200 will process (202) the packet using first flow operations to determine a first result for the packet. As described herein, virtual switches may include multiple flow operations to provide various operations, wherein the operations may include firewall operations, encryption operations, encapsulation operations, or some other similar operation. To provide the flow operations, the virtual switch employs multiple tables, or other similar data structures, wherein traits within the packet are identified (such as internet protocol addresses, media access control addresses, and the like) and apply an action based on the identified traits. These actions may include blocking a packet, encapsulating the packet, modifying attributes in the header of a packet, or some other similar action. However, because multiple tables are required to be traversed as part of each operation, inefficiencies can occur when multiple packets share the same traits, such as addressing traits. Consequently, rather than requiring each of the packets to traverse the entirety of the flow operations, first virtual switch 130 identifies the result of the flow operations on a first packet, which is the aggregate of all of the flow operations.

Once the first result is identified, first virtual switch 130 caches (203) the first result, such that it can be used with future packets that include similar attributes or traits. In particular, once the result is cached, first virtual switch 130 identifies (204) one or more additional packets with the first traits, and when the packets are identified, applies (205) the first result to the one or more additional packets. In this manner, rather than requiring each of the packets to traverse the flow operations, first virtual switch 130 may cache the result of a first packet and process subsequent packets with similar traits in accordance with the cached result. For example, when virtual node 120 initiates a communication with virtual node 123, first virtual switch 130 may identify the result of a first packet and apply the result to subsequent packets with similar traits. Accordingly, if the flow operations encapsulated the packet for transmission, then the encapsulation parameters may be stored as a result of the flow operation and applied to subsequent similar packets. Similarly, if a packet were to traverse the flow operations prior to being blocked or prevented from transmission by a firewall operation, the result may be used to quickly block future packets without requiring the traversal of unnecessary flow operations.

While demonstrated in the example of operation 200 as identifying egress packets from a virtual node, it should be understood that similar operations may be applied to ingress packets with a virtual node as a destination. For example, when a packet is received at first physical network interface 150 destined for virtual node 120, first virtual switch 130 may determine whether a result has been cached for the packet based on attributes in the packet. If a result has been cached, first virtual switch may process the packet in accordance with the result before providing (or blocking) the packet for virtual node 120. In contrast, if a result has not been cached, first virtual switch 130 may process the packet using a plurality of flow operations, and cache the result for use with future packets. Moreover, while the examples provided above describe the transfer of a packet between host computing systems, it should be understood that similar operations may be applied to packets that are communicated between virtual nodes on the same host.

Figure 3A:
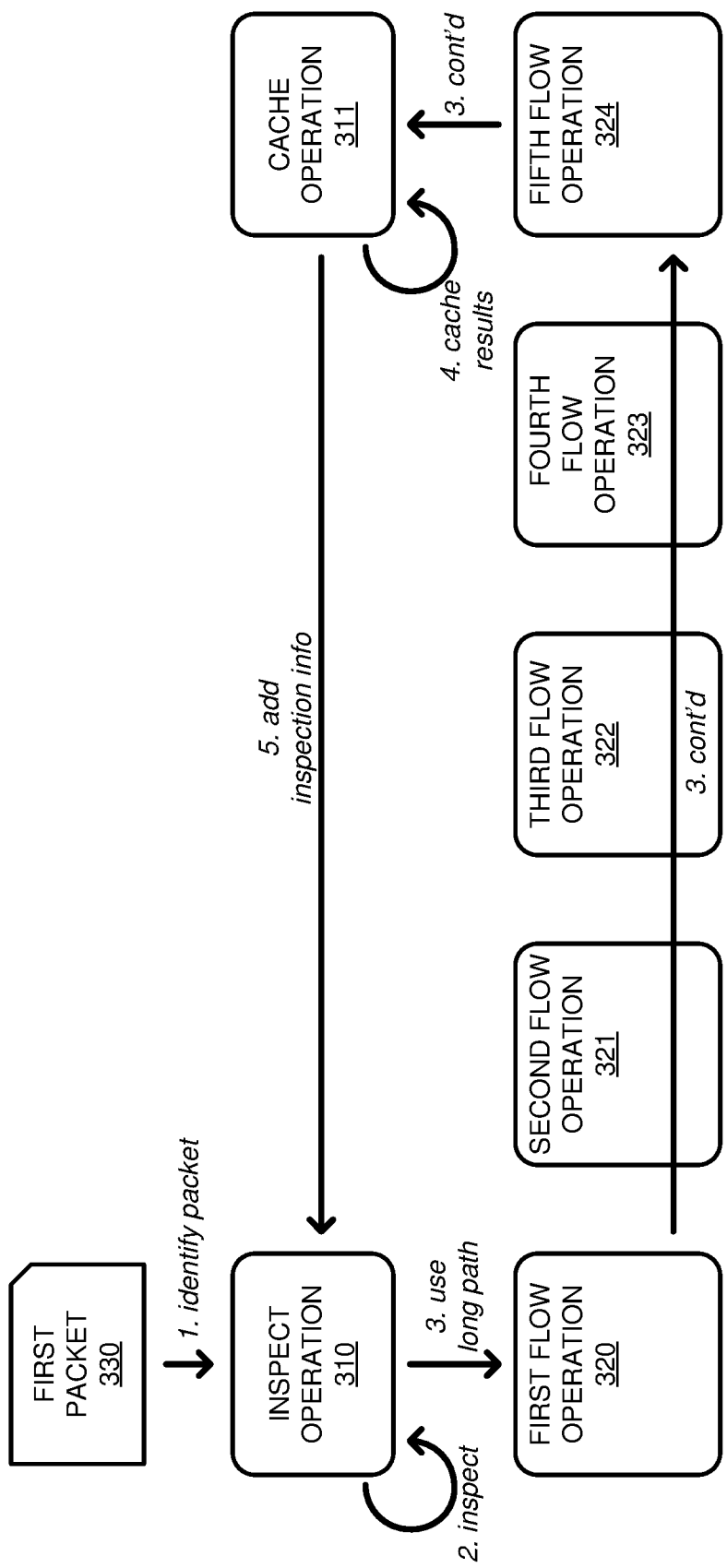
FIGS. 3A-3B illustrate an operational scenario of processing packet traits to cache results of flow operations according to an implementation.
Figure 3B:
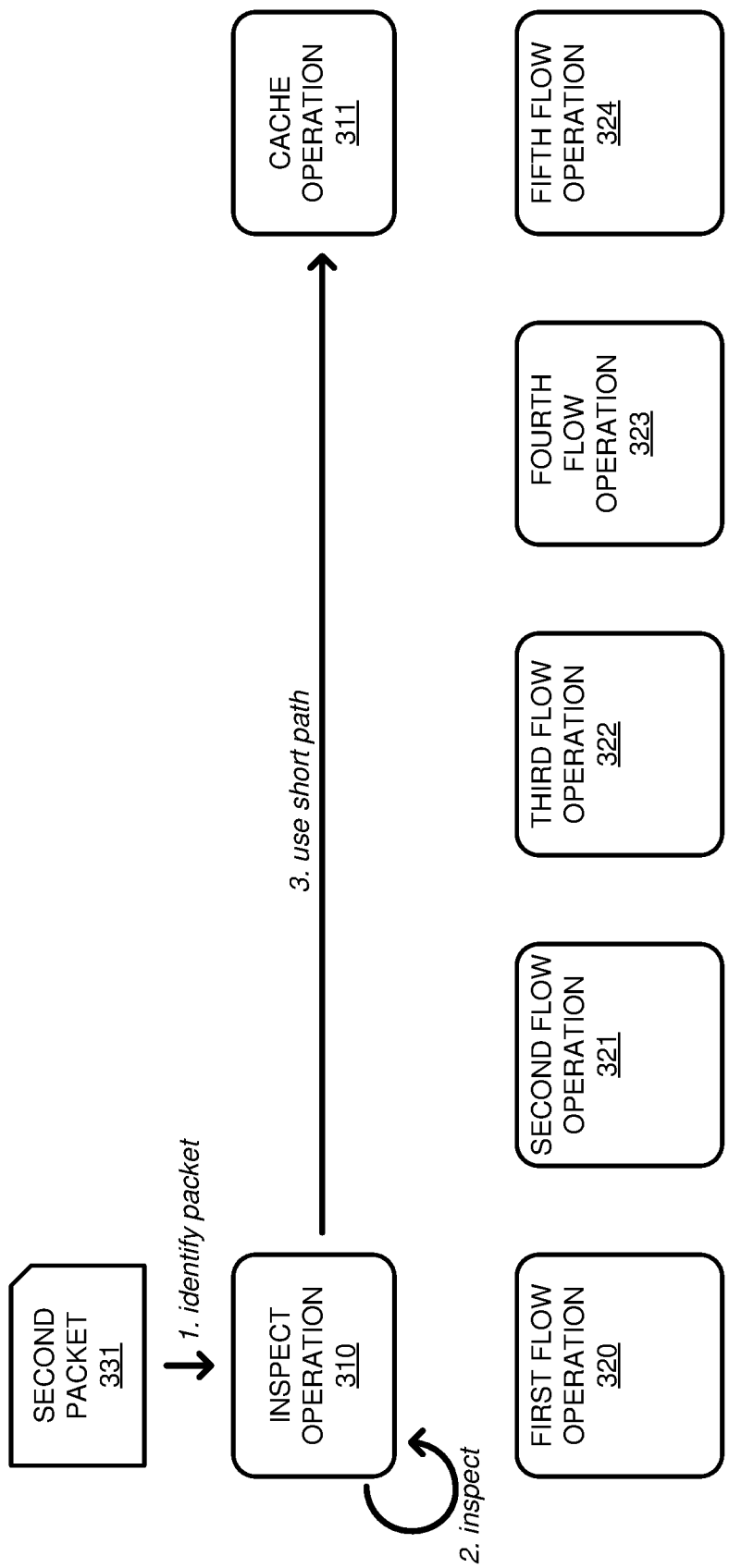

FIGS. 3A-3B illustrate an operational scenario of processing packet traits to cache results of flow operations according to an implementation. FIGS. 3A and 3B include first packet 330, second packet 331 (introduced in FIG. 3B), inspect operation 310, flow operations 320-324, and cache operation 311. FIGS. 3A and 3B demonstrate example operations for a virtual switch on a host computing system, such as host 105 or 106 from FIG. 1. Inspect operation 310 and cache operation 311, while illustrated as separate operations in the examples of FIGS. 3A-3B for clarity, should be understood to jointly provide packet process operation 200 of FIGS. 1-2.

Referring first to FIG. 3A, at step 1, inspect operation 310 identifies a packet from a virtual node to be communicated to a second computing node. This packet may be destined for another virtual node on the same host computing system, or may be destined for a computing node available to the host via a physical interface. In response to identifying the packet in the virtual switch, inspect operation 310 inspects the packet, at step 2, to determine whether the packet includes traits that qualify for a cached result. In inspecting the packet, inspect operation 310 may identify various addressing traits of the packet, such as IP addresses within the packet, MAC addresses in the packet, protocol information, port information, or some other similar addressing information within the packet. If a packet is identified with traits that qualify for a previously identified result, the packet may be forwarded to cache operation 311. In contrast, such as the example in FIG. 3A, when a result is not available for the packet, the packet uses the "long" traversal path that traverses flow operations 320-324, at step 3. The operations may provide firewall operations, encapsulation operations, encryption operations, switching and routing operations, or some other similar operation. Once the packet traverses the flow operations, cache operation 311 determines a result for the packet and caches the results at step 4. In determining the results for the packet, cache operation 311 may summarize any modifications, additions, drop actions, or other similar results for the packet. These results may include modifying bits and/or addressing in the header of the packet, encapsulating the packet with the addition of header information, performing encryption, a block action placed on the packet, or some other summary information for the packet. In some implementations, flow operations may perform unnecessary tasks in processing the packet. For example, flow operations 520-522 may perform operations that are used to modify data within the header of the packet. However, when the packet reaches fourth operation 523, the packet may be dropped, indicating that the first flow operations were unnecessary in processing the packet. Consequently, when cache operation 311 is performed, cache operation 311 will not cache information about the modifications to the packet, but will only cache information about the final result of the packet. In this example, that the packet was dropped.

After the result is identified for first packet 330, cache operation 311 will add, at step 5, inspection information for the packet to make the inspection information available for inspect operation 310. This inspection information includes traits for future packets that can be matched to the traits of the first packet. Thus, when a packet is identified with similar traits to that of first packet 330, it may not require operations 320-324 to be performed, but will rather use the cached result to determine any actions to be performed on the packet.

Turning to FIG. 3B, FIG. 3B demonstrates the communication of a second packet 331 with similar traits to that of first packet 330. As illustrated, at step 1, inspect operation 310 will identify second packet 331 after cache operation 311 has added the traits of the first packet to inspect operation 310. Once identified, inspect operation 310 will inspect the packet to determine if the traits in the packet match traits for a result or summary of a previously processed packet. In the present implementation, because second packet 331 includes similar traits to first packet 330 (e.g. addressing, protocol, port, and the like), inspect operation 310 may identify that the packet should be processed using cache operation 311 rather than flow operations 320-324. Once identified as being allocated to the "short" path, at step 3, cache operations 311 may process second packet 331 in accordance with the result from first packet 330. As an example, if the first packet were encapsulated as a result of flow operations 320-324, then cache operation 311 may use the encapsulation information of the first packet to encapsulate the second packet. This may include adding addressing information that was used in encapsulating the first packet, encryption mechanisms that were used in encapsulating the first packet, or any other similar information that was used in encapsulating the packet.

In some implementations, at least a portion of the flow operations in the "long" path may not provide any operation on a packet, or may modify the same information in the packet. As an example, first flow operation 320 may modify the same bits in the packet as fifth flow operation 324. As a result, only the modifications provided by the operation with the highest priority or that occurs last will be identified in the result by cache operation 311. In this manner, irrelevant operations are not required on the subsequent packets While demonstrated in the example of FIGS. 3A and 3B as providing flow operations on an egress packet from a virtual node, it should be understood that similar operations may be provided when a packet is an ingress packet for a virtual node. For example, if a packet were received at a physical network interface for the host, the virtual switch may determine whether a result was cached for the packet, and process the packet either using a set of flow operations or a cached result for the flow operations based on whether a result is cached for the packet.

Figure 4:
FIG. 4 illustrates a data structure to manage cached results and packet traits according to an implementation.

FIG. 4 illustrates a data structure 400 to manage cached results and packet traits according to an implementation. Data structure 400 includes columns for source IP addresses 410, destination IP address 411, source MAC addresses 412, destination MAC addresses 413, and cached results 414. Although demonstrated in the example of data structure 400 with four traits to be identified within a packet, it should be understood that additional or fewer traits may be identified.

As described herein, as ingress and/or egress packets are identified for virtual nodes on a host, the virtual switch may inspect the packets to determine if a cached result exists for traits in the packet. In the present implementation, the traits comprise addressing traits that can be identified from the header of the packet and compared against traits that are cached in data structure 400. If a match exists within data structure 400, then the packet may be processed in accordance with a cached result in cached results 414. In contrast, if a match does not exist within data structure 400, then the packet may be processed using a plurality of flow operations or tables, wherein each of the operations identifies traits within the packet and applies an action on the packet. These actions may include modifying bits within the packet, adding bits to the packet, blocking the packet, or providing some other similar operation. Once the packet is processed using the plurality of flow operations, the result of the flow operations may be cached in data structure 400, and the traits of the original packet may be stored in columns 410-413 to trigger the application of the result on the packet. As a result, any packet that shares traits with the original packet may, instead of being processed by the plurality of flow operations, be processed in accordance with a cached result.

As a first example, if packet included a source IP address 421, a destination IP address 426, a source MAC address 431, and a destination MAC address 436, then the packet may be processed in accordance with result 441. This result may apply various operations to the packet including modifying one or more bits within the packet, modifying addressing of the packet, adding encapsulation or encryption to the packet, blocking the packet or some other similar operation. The result operations are an aggregation or summary of the operations that were performed via the flow operations. Consequently, if the flow operations modified a bit multiple times, the flow operation with the highest priority (or last flow operation) would be the only modification recorded in the result. Additionally, if flow operations modified the packet or performed various other operations prior to the packet being dropped by a flow operation, the result would only indicate that the packet was dropped, which would not require the other modifications to the packet.

In a second example, when a packet is identified in the virtual switch that does not have traits that correspond to the traits in data structure 400, the packet may be passed through a plurality of flow operations. Once processed in accordance with the flow operations, a result will be determined based on the actions taken by the flow operations, and the result may be stored in cached results 414. Consequently, when a packet with similar traits is identified, that packet may be processed in accordance with the results rather than applying the flow operations.

Figure 5:
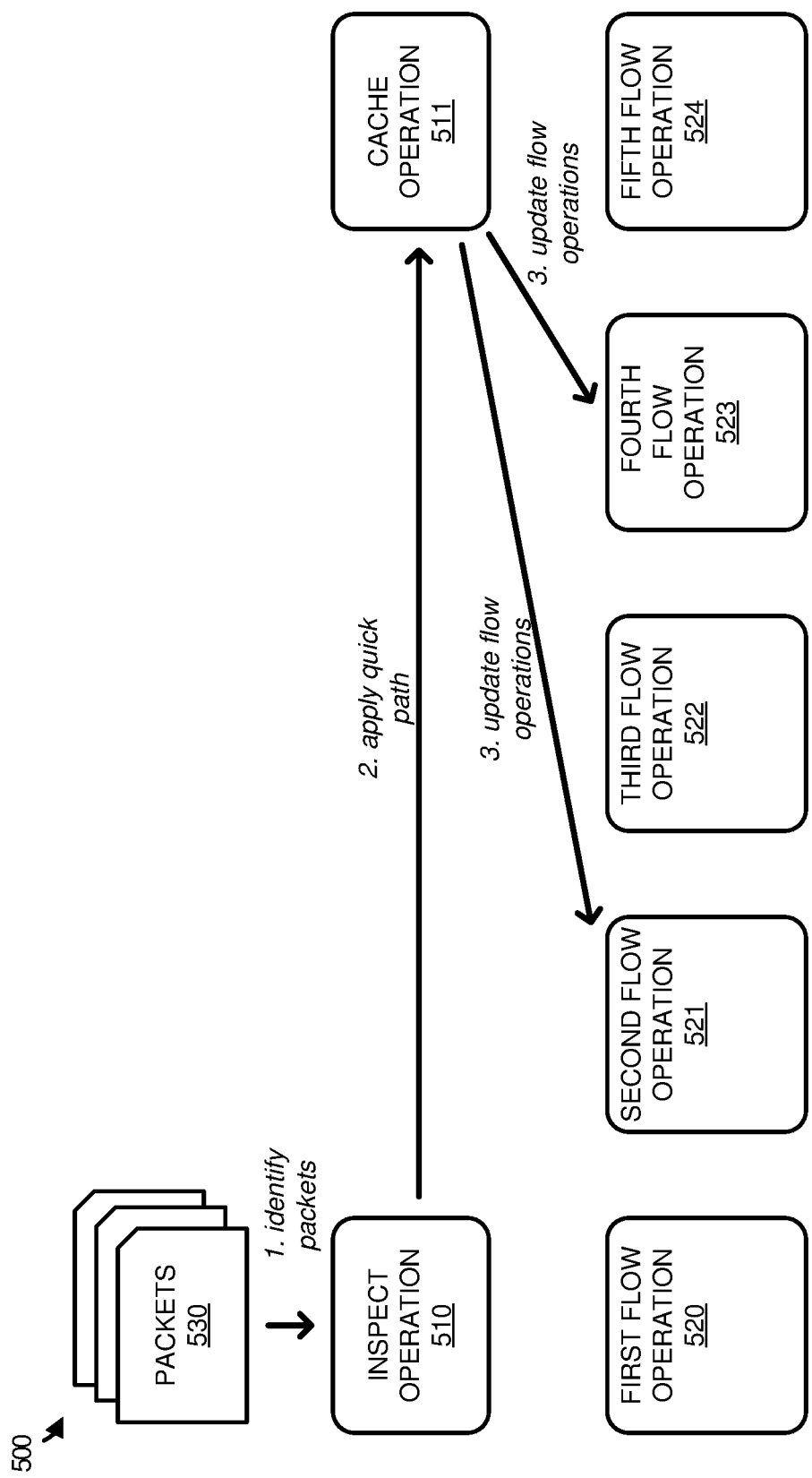
FIG. 5 illustrates an operational scenario of updating flow operations according to an implementation.

FIG. 5 illustrates an operational scenario 500 of updating flow operations according to an implementation. Operational scenario 500 includes packets 530, inspect operation 510, cache operation 511, and flow operations 520-524. Inspect operation 510 and cache operation 511, while illustrated as separate operations in the example of FIG. 5 for clarity, should be understood to jointly provide packet process operation 200 of FIGS. 1-2.

As depicted, inspect operation 510, operating as part of a virtual switch on a host, identifies packet 530 at step 1. In response to identifying the packets, inspect operation 510 will inspect the packets to identify traits in the packet, such as source and destination addressing, and compare the traits to traits of cached packets. If a match exists, such as the example in FIG. 5 and illustrated in step 2, the packets are provided with a short processing path with cache operation 511, wherein the packets will be processed in accordance with a result associated with the traits. This result may include modifying portions of the packet, encapsulating the packet, encrypting the packet, blocking the packet, or providing other similar operation with respect to the packet.

Here, in addition to processing each of the packets in accordance with the cache operation, cache operation 511 will also update flow operations of flow operations 520-524. In particular, cache operation 511 updates, at step 3, second flow operation 521 and fourth flow operation 523. In providing the update cache operation 511 may provide information about the number of packets that would have qualified for the flow operation, an indication that a virtual node (or MAC address) is still active on the host, or some other similar information. In this manner, although the flow operations may not process the packet directly, any counters or activity monitoring of the flow operations may be updated as though the packet was processed by the individual flow operations. These updates may be provided periodically by cache operation 511, may be provided when a particular number of packets are processed using cache operation 511, or may be provided at any other interval to the required flow operations.

Figure 6:
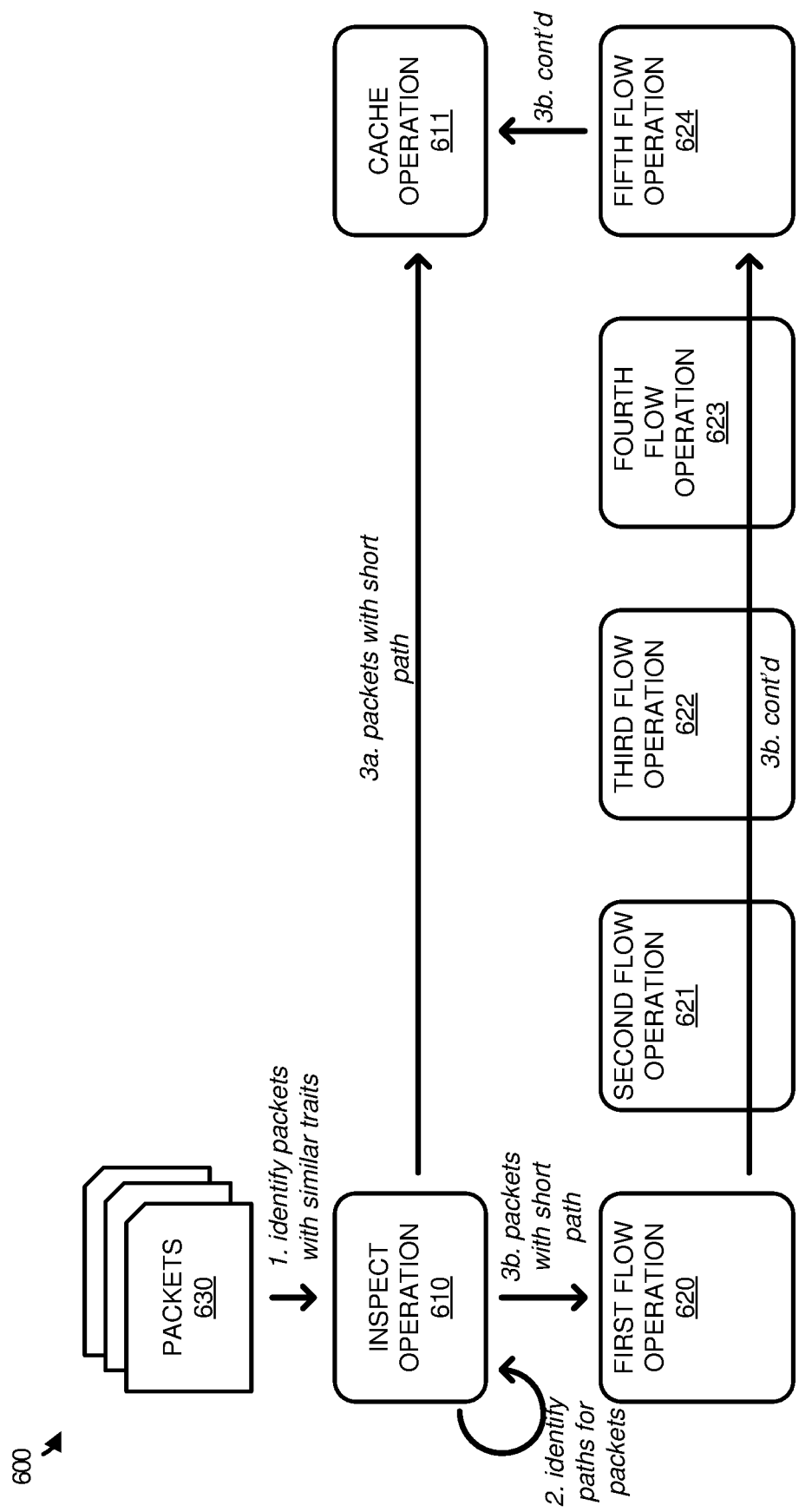
FIG. 6 illustrates an operational scenario of providing packets to flow operations according to an implementation

FIG. 6 illustrates an operational scenario 600 of providing packets to flow operations according to an implementation. Operational scenario 600 includes packets 630, inspect operation 610, cache operation 611, and flow operations 620-624. Although demonstrated with five flow operations in the present implementation, it should be understood that a virtual switch may employ varying numbers of flow operations. Inspect operation 610 and cache operation 611, while illustrated as separate operations in the example of FIG. 6 for clarity, should be understood to jointly provide packet process operation 200 of FIGS. 1-2.

In operation, inspect operation 610 identifies, at step 1, packets 630, wherein the packets include similar traits. As the packets are received inspect operation 610 will identify, at step 2, processing paths for each of the packets. In the present example, because packets 630 qualify for a cached result, the packets may be processed, at step 3a, using cache operation 611. This cache operation is used to process packets in accordance with a cached result which may modify, block, or add additional information to the packet. Here, in addition to the processes provided by cache operation 611, a subset of the packets may also be processed using flow operations 620-624. Thus, rather than only using one of cache operation 611 or flow operations 620-624, a subset of the packets may be processed using both of the operations. This subset may be selected based on a timer at inspect operation 610 (such as every 5 seconds), may be selected when a quantity of packets is identified by inspect operation 610, or may be selected in any other similar method. In selecting a subset of the packets to be processed via both the cache operation and the flow operations, flow operations may be updated on the status of virtual nodes, even though the packets for the virtual nodes are not required to be processed using the flow operations. For example, second flow operation 621 may include a "keep-alive" timer that is used to identify when a virtual node is no longer active on the host computing system. To ensure that the flow operation identifies that the virtual node is active, inspect operation 610 may provide a portion of packets 630 through flow operations 620-624 to ensure that the virtual node is identified as active. Once the subset of packets is processed via flow operations 620-624, the packets may be dropped ensuring that they are not forwarded to a destination computing node if required. Accordingly, while a packet may be processed using both the cache operation and the flow operations, only the cache operation may be responsible for forwarding the packets to the destination computing node, ensuring that duplicate packets are not received by the destination computing node.

Figure 7:
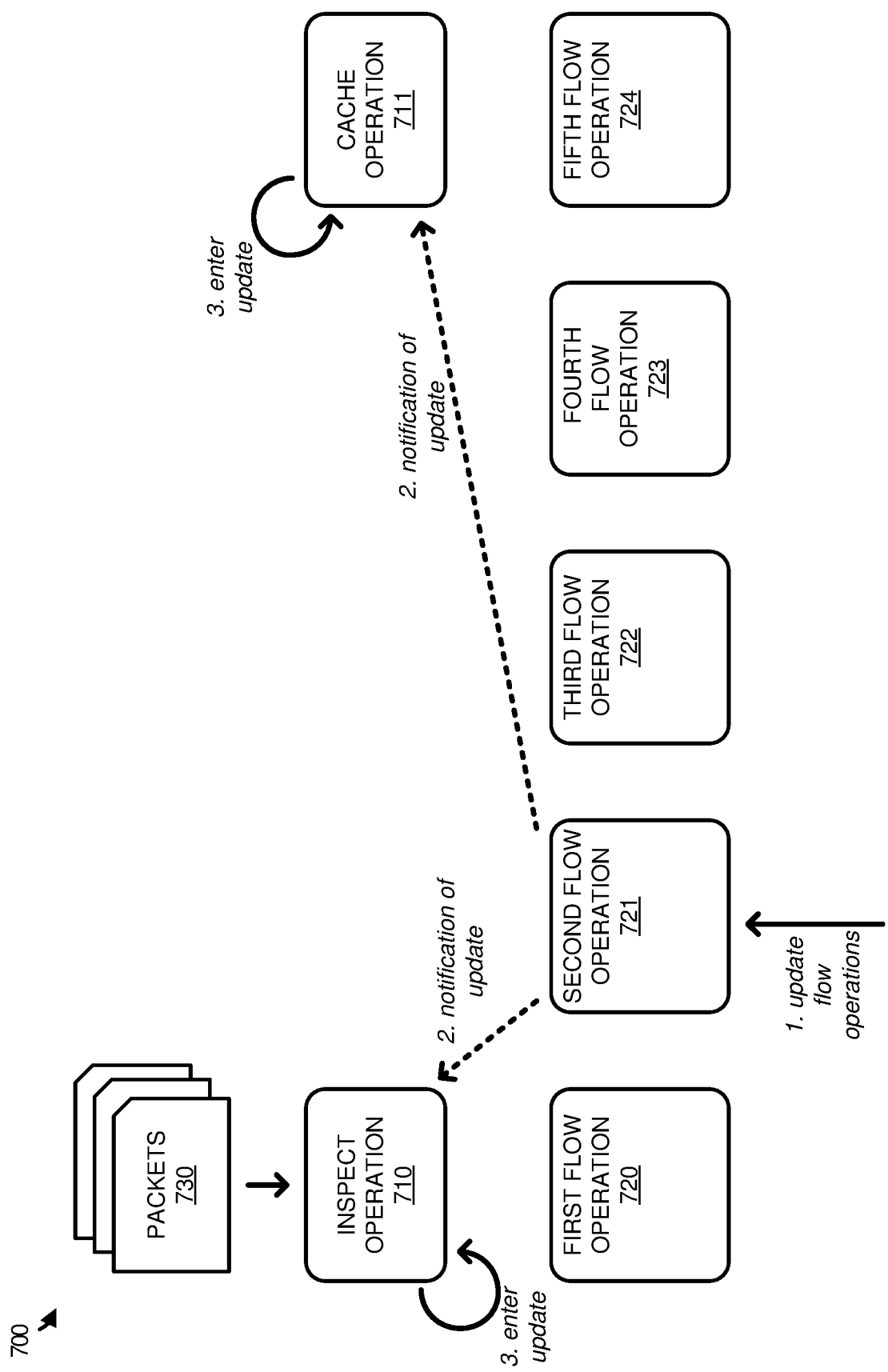
FIG. 7 illustrates an operational scenario of removing cached results to flow operations according to an implementation.

FIG. 7 illustrates an operational scenario 700 of removing cached results to flow operations according to an implementation. Operational scenario 700 includes inspect operation 710, cache operation 711, and flow operations 720-724. Inspect operation 710 and cache operation 711, while illustrated as separate operations in the example of FIG. 7 for clarity, should be understood to jointly provide packet process operation 200 of FIGS. 1-2.

As described herein, when virtual nodes executing on a host require ingress and egress data packets, a virtual switch, also operating on the host, may process the packets in accordance with various flow operations. These flow operations provide various functions, including firewall functions, encryption and encapsulation functions, switching and routing functionality, or some other similar function. These flow operations are often configured via a virtual switch manager, which can create, modify, and remove flow operations from the particular virtual switch. In the present implementation, a modification is made to second flow operation 721 at step 1, which is provided as an update to inspect operation 710 and cache operation 711 at step 2. In some examples, when the update is provided to second flow operation 721 by the virtual switch manager, the virtual switch manager may also provide a notification to operations 710-711 to ensure that they are notified of the update. In other implementations, operations 710-711 may monitor the flow operations to identify when a modification or update is made to the particular flow operation. As a result, when the modification is identified for second flow operation 711, operations 710-711 may also be updated.

After operations 710-711 identify the update to second flow operation 721, the one or more data structures of operations 710-711 may be updated, at step 3, to ensure that any results that are cached from the previous version of second flow operation 721 are no longer cached. In some examples, rather than clearing the entire cache, operations 710-711 may only clear results that are affected by the flow operation (e.g. packets of a particular type). In other examples, operations 710-711 may clear the entire cache to ensure that the new modification does no have an affect on any of the cached results.

For an illustrative example, operations 710-711 may cache a result for packets with similar traits to packets 730, wherein the result may permit the packets to be communicated to other computing nodes. After the update is provided to second flow operation 721, and entered as an update for operations 710-711, the result for packets 730 may be removed, such that a cached result is no longer used when a packet with similar attributes to packets 730 is identified. Instead, when at least the first packet is identified of packets 730, inspect operation 710 will identify that a result is no longer cached for the packet, and will instead process the packets in accordance with flow operations 720-724. Once processed in accordance with the flow operations, the result may be cached via cache operation 711. Referring to the update, the update to second flow operation may cause packets 730 to be blocked when the traits are identified. Accordingly, by ensuring that a new result is obtained for the packets in response to the modification to the operation, the newly cached result by cache operation 711 may be used to block packets 730, while the previous result would have permitted packets 730 to be communicated to the destination computing node.

Although this is one example of removing results from the cache, it should be understood that other processes may also be used to remove a result from a cache. For example, result entries within the cache may be removed when the cache exceeds a size limit, may be removed when packets with corresponding traits have not been identified for a period of time, may be removed after the expiration of a time period, or may be removed at any other similar instance.

Figure 8:
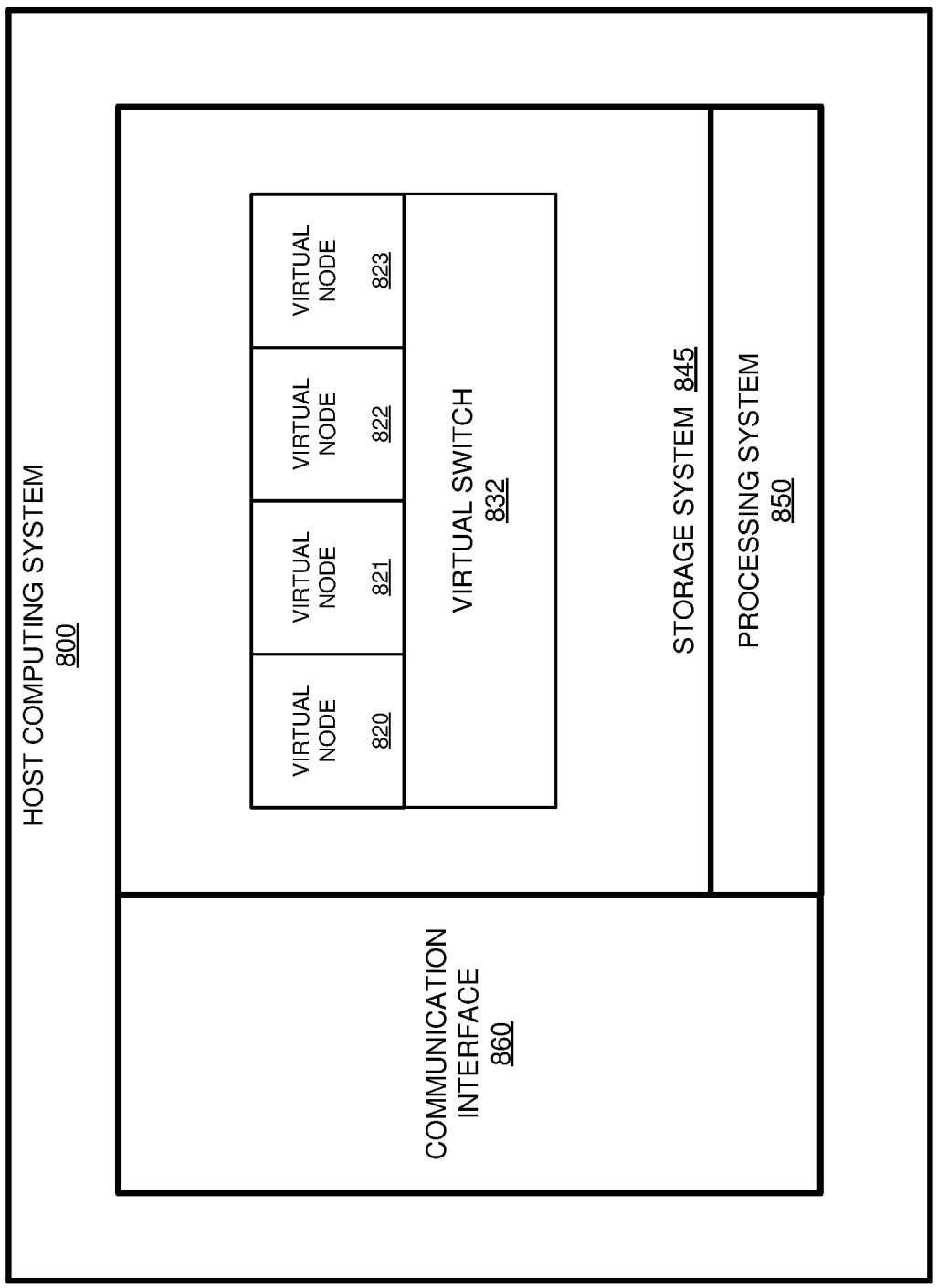
FIG. 8 illustrates a host computing system according to an implementation.

FIG. 8 illustrates a host computing system 800 according to an implementation. Host computing system 800 is representative of any computing system or systems with which the various operational architectures, processes, scenarios, and sequences disclosed herein for a host can be implemented. Host computing system 800 is an example of host 105 or host 106 of FIG. 1, although other examples may exist. Host computing system 800 includes storage system 845, processing system 850, and communication interface 860. Processing system 850 is operatively linked to communication interface 860 and storage system 845. Communication interface 860 may be communicatively linked to storage system 845 in some implementations. Host computing system 800 may further include other components such as a battery and enclosure that are not shown for clarity.

Communication interface 860 comprises components that communicate over communication links, such as network cards, ports, radio frequency (RF), processing circuitry and software, or some other communication devices. Communication interface 860 may be configured to communicate over metallic, wireless, or optical links. Communication interface 860 may be configured to use Time Division Multiplex (TDM), Internet Protocol (IP), Ethernet, optical networking, wireless protocols, communication signaling, or some other communication format—including combinations thereof. Communication interface 860 is an example of physical network interface 150 and may be configured to communicate with other host computing systems in a computing environment, and may further be configured to communicate with one or more other networked computing systems and devices. Communication interface 860 may include hardware and software systems capable of filtering packets based on a configuration provided by interface configuration service 830.

Processing system 850 comprises microprocessor and other circuitry that retrieves and executes operating software from storage system 845. Storage system 845 may include volatile and nonvolatile, removable and non-removable media implemented in any method or technology for storage of information, such as computer readable instructions, data structures, program modules, or other data. Storage system 845 may be implemented as a single storage device, but may also be implemented across multiple storage devices or sub-systems. Storage system 845 may comprise additional elements, such as a controller to read operating software from the storage systems. Examples of storage media include random access memory, read only memory, magnetic disks, optical disks, and flash memory, as well as any combination or variation thereof, or any other type of storage media. In some implementations, the storage media may be a non-transitory storage media. In some instances, at least a portion of the storage media may be transitory. It should be understood that in no case is the storage media a propagated signal.

Processing system 850 is typically mounted on a circuit board that may also hold the storage system. The operating software of storage system 845 comprises computer programs, firmware, or some other form of machine-readable program instructions. The operating software of storage system 845 comprises virtual nodes 820-823, and virtual switch 832 (representative of virtual switch capable of providing at least operation 200 described in FIGS. 1 and 2). The operating software on storage system 845 may further include an operating system, utilities, drivers, network interfaces, applications, or some other type of software. When read and executed by processing system 850 the operating software on storage system 845 directs host computing system 800 to operate as described herein.

In at least one implementation, virtual switch 832, when executed by processing system 850, provides a communication platform for virtual nodes 820-823. To provide the communications for the virtual nodes, virtual switch 832 may be configured with flow operations that are responsible for firewall processes, switching and routing processes, encapsulation and encryption processes, or some other similar operation. In addition to the aforementioned flow operations, virtual switch 832 may also include a cache operation that is used to cache results of the previously mentioned flow operations and expedite the processing of a packet based on the results of the flow operation.

As an example, when an ingress or egress packet for a virtual node of virtual nodes 820-823 is identified by virtual switch 832, virtual switch 832 may determine whether a cached result action in a set of result actions is associated with traits of the packet. In particular, virtual switch 832 may perform packet inspection to identify traits, such as the IP addresses, MAC addresses, protocol, or some other similar information from the header of the packet. Once the traits are identified, virtual switch 832 may compare the traits to traits that were identified in previous packets to determine if a result action is available for the identified packet. If a result action is available for the packet, virtual switch 832 may process the packet in accordance with the cached result. In contrast, if a result action is not available for the packet, virtual switch 832 may process the packet in accordance with first flow operations to determine a result action, and cache the result action with the set of result actions.

In some implementations, the first flow operations may block, permit, and/or modify portions of the header for the packet. The result of the flow operations is then cached, such that newly identified packets with similar header attributes may be processed based on the previously identified result. For example, a first packet may be encapsulated using one of the flow operations, and header information for the encapsulation may be cached as a result within a data structure of the virtual switch. Consequently, when a second packet is identified with similar traits, the cached encapsulation information may be used for the second packet, wherein the encapsulation information may include addressing information, encryption information, or any other similar information. Additionally, if a cached action indicated that a packet with similar attributes may was dropped (e.g. if a firewall blocked the packet), the cached action may drop similar packets without requiring the use of additional flow operations.

In some implementations, by skipping the flow operations and using the cached action, the flow operations may be required updates from the cache operation about packets that are using the cached actions. As an example, a flow operation may maintain packet statistics information, and require information about the number of packets with particular attributes. As a result, the caching operation may be required to provide updates to the flow operation indicating a quantity of packets were identified with particular attributes. These notifications may be supplied periodically, based on a request from the flow operation, when a particular quantity of packets have been identified, or at any other interval.

In some examples, at least a portion of the flow operations may include "keep-alive" functionality, which can be used to determine whether virtual nodes are still active in the computing environment, amongst other operations. As a result, although packets with traits identified for a cache action may be processed in accordance with the cached action, at least a subset of the packets may also be processed in accordance with the plurality of flow operations, such that the flow operations may be notified about actions for particular virtual nodes.

The descriptions and figures included herein depict specific implementations of the claimed invention(s). For the purpose of teaching inventive principles, some conventional aspects have been simplified or omitted. In addition, some variations from these implementations may be appreciated that fall within the scope of the invention. It may also be appreciated that the features described above can be combined in various ways to form multiple implementations. As a result, the invention is not limited to the specific implementations described above, but only by the claims and their equivalents.

What is claimed is:

1. A method of operating a virtual switch on a host computing system, the method comprising:
   identifying a packet from a first virtual node with first traits;
   in response to identifying the packet, determining whether a cached result action in a set of result actions is associated with the first traits, wherein each result action in the set of result actions comprises an action applied to a previously identified packet based on one or more flow operations;
   if a cached result action is not associated with the first traits:
      processing the packet in accordance with first flow operations to determine a result action; and
      caching the result action with the set of result actions;
   if a cached result action is associated with the first traits:
      processing the packet in accordance with the cached result action; and
      providing an update to one or more flow operations in a set of flow operations that generated the cached result action, wherein the update indicates a status associated with at least one virtual node.

2. The method of claim 1, wherein the first traits comprise addressing traits of the packet.

3. The method of claim 2, wherein the addressing traits comprise at least source and destination internet protocol addresses, and source and destination media access control addresses.

4. The method of claim 1, wherein the first flow operations comprise a firewall operation, a switching/routing operation, an encapsulation operation, an encryption operation, a port mirroring operation, and/or a load balancing operation.

5. The method of claim 1, wherein the result action indicates a modification to an attribute in a header for the packet caused by a flow operation of the first flow operations.

6. The method of claim 1, wherein the result action comprises at least a portion of encapsulation header information for the packet.

7. The method of claim 1, wherein the virtual node comprises a virtual machine or a container.

8. The method of claim 1 further comprising:
   identifying a second packet received on a physical network interface of the host computing system, wherein the second packet comprises second traits;
   in response to identifying the packet received on the physical network interface, determining whether a cached result action in the set of result actions is associated with the second traits;
   if a cached result action is not associated with the second traits:
      process the second packet in accordance with second flow operations to determine a second result action; and
      cache the second result action with the set of result actions;
   if a cached result action is associated with the second traits:
      process the second packet in accordance with the cached result action.

9. The method of claim 1 further comprising:
   identifying a modification to a flow operation in the first flow operations; and
   removing one or more result actions in the set of result actions based on the modification.

10. A host computing system comprising:
    one or more non-transitory computer readable storage media;
    a processing system operatively coupled to the one or more non-transitory computer readable storage media; and
    program instructions stored on the one or more non-transitory computer readable storage media to operate a virtual switch on the host computing system that, when read and executed by the processing system, direct the processing system to at least:
       identify a packet from a first virtual node with first traits;
       in response to identifying the packet, determine whether a cached result action in a set of result actions is associated with the first traits, wherein each result action in the set of result actions comprises an action applied to a previously identified packet based on one or more flow operations;
       if a cached result action is not associated with the first traits:
          process the packet in accordance with first flow operations to determine a result action; and
          cache the result action with the set of result actions;
       if a cached result action is associated with the first traits:
          process the packet in accordance with the cached result action; and
          provide an update to one or more flow operations in a set of flow operations that generated the cached result action, wherein the update indicates a status associated with at least one virtual node.

11. The host computing system of claim 10, wherein the first traits comprise addressing traits of the packet.

12. The host computing system of claim 11, wherein the addressing traits comprise at least source and destination internet protocol addresses, and source and destination media access control addresses.

13. The host computing system of claim 10 wherein the first flow operations comprise a firewall operation, a switching/routing operation, an encapsulation operation, an encryption operation, a port mirroring operation, and/or a load balancing operation.

14. The host computing system of claim 10, wherein the result action indicates a modification to an attribute in a header for the packet caused by a flow operation of the first flow operations.

15. The host computing system of claim 10, wherein the result action comprises at least a portion of encapsulation header information for the packet.

16. The host computing system of claim 10, wherein the virtual node comprises a virtual machine or a container.

17. The host computing system of claim 10, wherein the program instructions further direct the processing system to:
- identify a second packet received on a physical network interface of the host computing system, wherein the second packet comprises second traits;
- in response to identifying the packet received on the physical network interface, determine whether a cached result action in the set of result actions is associated with the second traits;
- if a cached result action is not associated with the second traits:
  - process the second packet in accordance with second flow operations to determine a second result action; and
  - cache the second result action with the set of result actions;
- if a cached result action is associated with the second traits:
  - process the second packet in accordance with the cached result action.

18. The host computing system of claim 10, wherein the program instructions further direct the processing system to:
- identify a modification to a flow operation in the first flow operations; and
- remove one or more result actions in the set of result actions based on the modification.

19. A system comprising:
- a plurality of host computing systems;
- a first host computing system in the plurality of host computing systems configured to:
  - identify a packet from a virtual node with first traits;
  - in response to identifying the packet, determine whether a cached result action in a set of result actions is associated with the first traits, wherein each result action in the set of result actions comprises an action applied to a previously identified packet based on one or more flow operations;
  - if a cached result action is not associated with the first traits:
    - process the packet in accordance with first flow operations to determine a result action;
    - cache the result action with the set of result actions; and
    - forward the processed packet to a second host computing system in the plurality of host computing systems;
  - if a cached result action is associated with the first traits:
    - process the packet in accordance with the cached result action;
    - forward the processed packet to the second host computing system in the plurality of host computing systems; and
    - provide an update to one or more flow operations in a set of flow operations that generated the cached result action, wherein the update indicates a status associated with at least one virtual node.

20. The system of claim 19, wherein the second host computing system is further configured to:
- receive the processed packet from the first host computing system;
- determine whether a cached result action in a second set of result actions is associated with traits of the processed packet;
- if a cached result action is not associated with the traits of the processed packet:
  - process the processed packet in accordance with second flow operations to determine a second result action; and
  - cache the second result action with the second set of result actions;
- if a cached result action is associated with the traits of the processed packet:
  - process the processed packet in accordance with the cached result action.

* * * * *